A. J. KAISER & F. C. PETERS.
STALL GUARD.
APPLICATION FILED APR. 28, 1917.
1,252,447.
Patented Jan. 8, 1918.
2 SHEETS—SHEET 1.
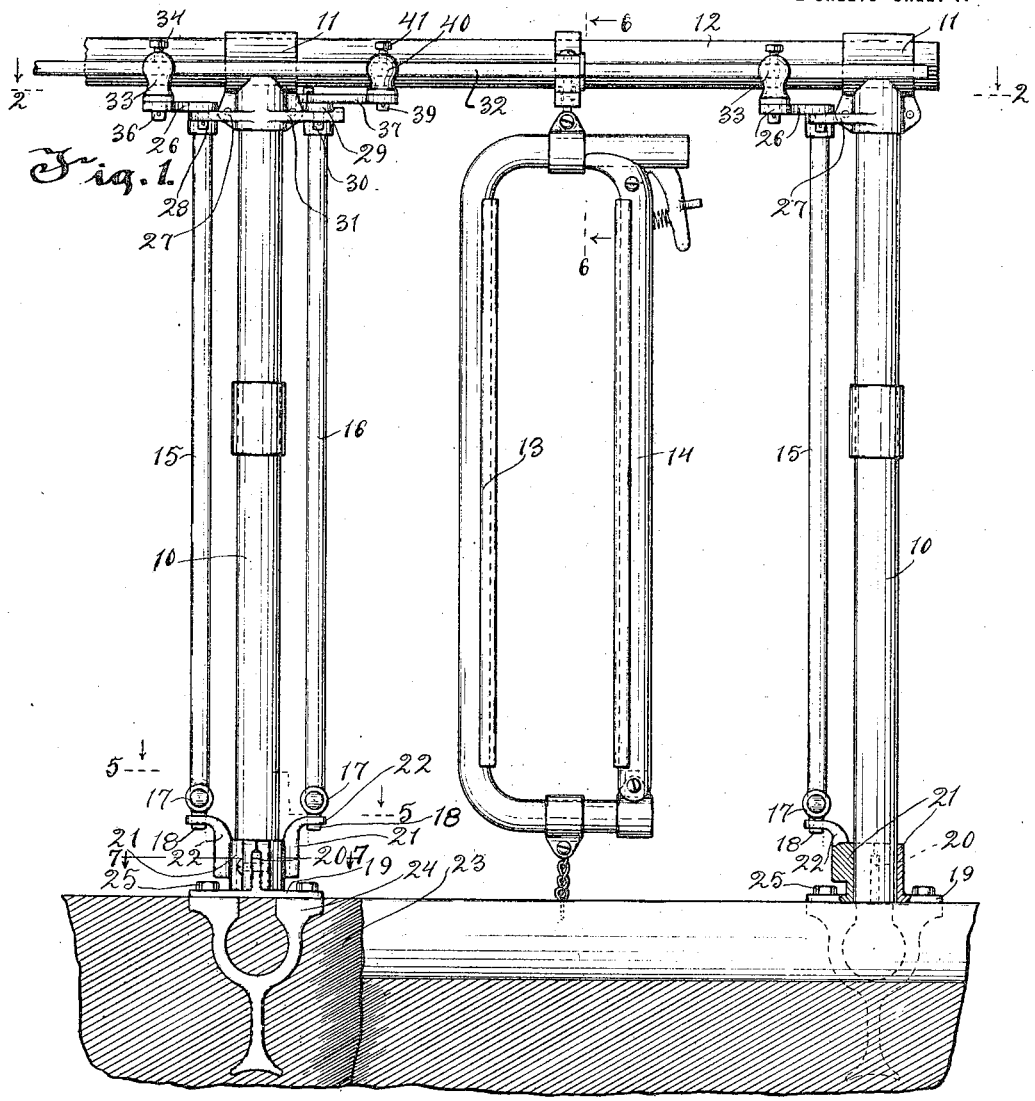
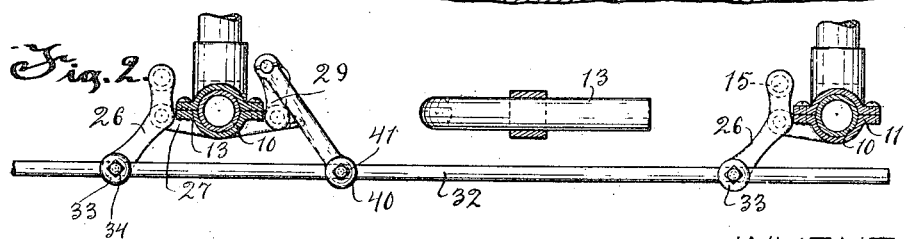
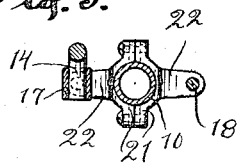
INVENTORS
August J. Kaiser
Fay C. Peters
ATTORNEYS A. J. KAISER & F. C. PETERS.
STALL GUARD.
APPLICATION FILED APR. 28, 1917.
1,252,447. Patented Jan. 8, 1918.
2 SHEETS—SHEET 2.
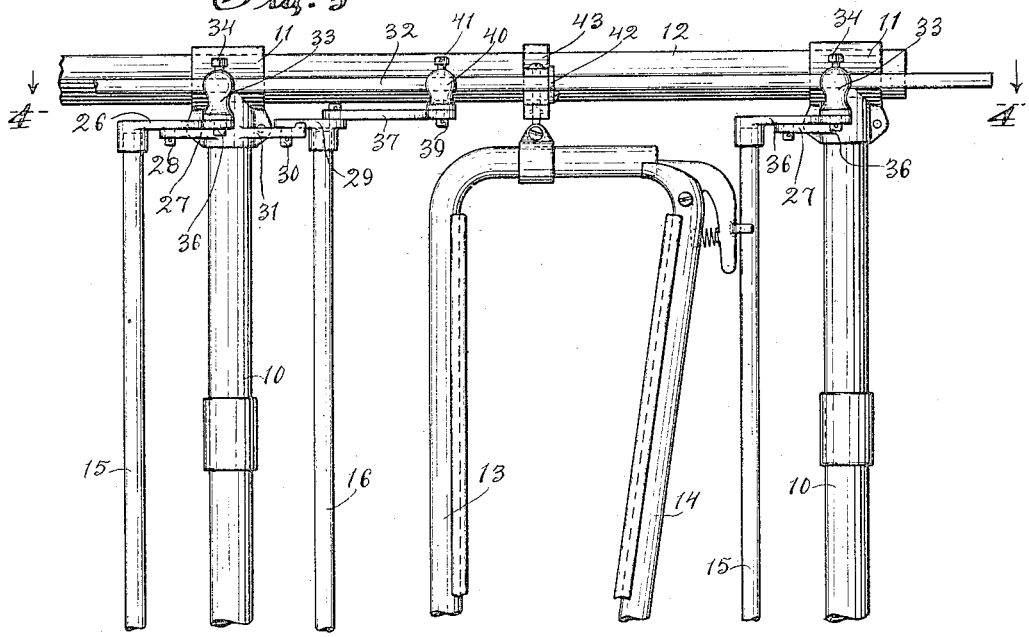
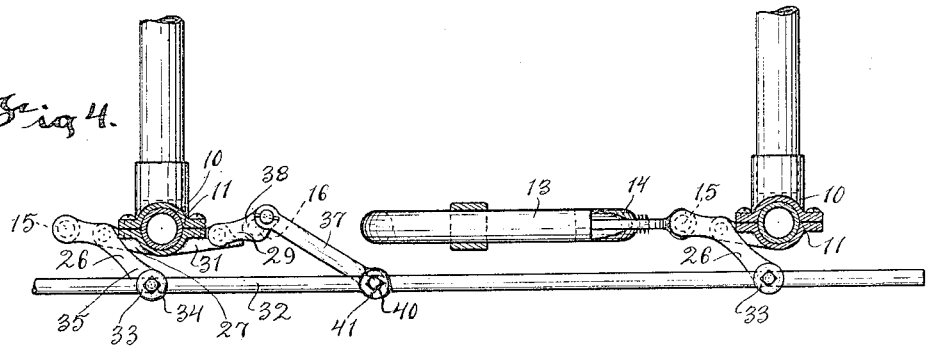
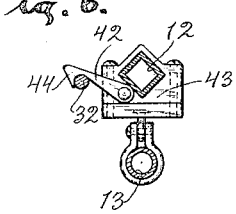
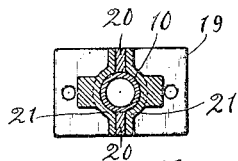
INVENTORS
August J. Kaiser
Fay C. Peters
Morsell, Keeney & French.
ATTORNEYS

UNITED STATES PATENT OFFICE.

AUGUST J. KAISER AND FAY C. PETERS, OF WATERLOO, WISCONSIN, ASSIGNORS TO DREW CARRIER COMPANY, OF WATERLOO, WISCONSIN, A CORPORATION OF WISCONSIN.

STALL-GUARD.

1,252,447.     Specification of Letters Patent.     Patented Jan. 8, 1918.

Application filed April 28, 1917. Serial No. 165,146.

*To all whom it may concern:*

Be it known that we, AUGUST J. KAISER and FAY C. PETERS, citizens of the United States, and residents of Waterloo, in the county of Jefferson and State of Wisconsin, have invented new and useful Improvements in Stall-Guards, of which the following is a description, reference being had to the accompanying drawings, which are a part of this specification.

The invention relates to stall guards.

The invention is designed more particularly to provide stall guards for cattle stalls in which the guards are moved simultaneously into the space between the standards and both sides of the stanchion to prevent the animals entering their heads between said standards and stanchion when driven into the stalls and movable out of guarding position away from the stanchion when the animal is secured therein to allow the animal plenty of free movement.

The invention is further designed to provide a stall guard construction in which the sets of guards are mounted on the standards of the stalls, the guards of each set being horizontally movable to position between the standard and the adjacent stanchions.

The invention is further designed to provide a mounting for the guards and the stall uprights.

The invention is further designed to provide simple and efficient means for operating the guards.

The invention further consists in the several features hereinafter set forth and more particularly defined by claims at the conclusion hereof.

In the drawings:

Figure 1 is a view of the device embodying the invention, the guards being shown in inoperative position, parts being broken away and parts being shown in section;

Fig. 2 is a section taken on the line 2—2 of Fig. 1;

Fig. 3 is a view similar to Fig. 1 showing the guards in guarding position, parts being broken away;

Fig. 4 is a section taken on the line 4—4 of Fig. 3;

Fig. 5 is a section taken on the line 5—5 of Fig. 1;

Fig. 6 is a section taken on the line 6—6 of Fig. 1;

Fig. 7 is a section taken on the line 7—7 of Fig. 1.

In the drawings, the numeral 10 represents the stall frame posts or division standards which are connected by couplings 11 to the top rail 12 to form a series of stalls in which stanchion 13 including a movable side bar 14 is hung in the usual manner.

The guards are adapted to move into and out of guarding position between both sides of the stanchion and the adjacent stall posts 10, said guards being arranged in sets and mounted as hereinafter described except that at the end of the row of stalls only a single guard is necessary.

Each set of guards includes guard bars 15 and 16, each bar having a curved end 14' carrying a collar 17 provided with a projection 18 pivotally mounted in a combined stall post and guard mounting. This mounting consists of a plate 19 having an aperture therein for receiving the lower end of the stall post 10 and provided with oppositely disposed upright flanges 20 to which mating coupling members 21 are bolted, said members having laterally projecting arms 22 provided with apertures for receiving the pivot projections 18, said plate being securely anchored to the concrete curb 23 by an anchoring device 24 removably secured to the plate by bolts 25. By this construction both the guards and the stall posts are secured together and to a common anchor. A lever 26 is secured at one end to the upper end of the bar 15 and is pivotally mounted intermediate its ends upon an arm 27 on one of the members forming the coupling 11 by means of a pin 28 integral with the lever 26 projecting through an aperture in said arm 27. A lever 29, carrying a pin 30 at one end pivotally mounted in an arm 31 on the other side of the coupling member carrying the arm 27, is connected intermediate of its ends to the upper end of the bar 16.

The means for simultaneously operating the guards comprises the levers 26 and 29, an operating rod 32 extending longitudinally of the stalls and connections between said rod 32 and said levers. The connection between the lever 26 and the rod 32 consists of an arm 33 mounted on and adjustably secured to the rod 32 by a set screw 34 and pivotally connected to the end 35 of the lever 26 by a pin 36 integral with the arm and passing through an aperture in said lever. The connection between the lever 29 and the rod 32 consists of a link 37 pivotally connected at one end to the end 38 of the lever 29 and pivotally connected at its other end to a pin 39 carried by an arm 40 mounted on and adjustably secured to the rod 32 by a set screw 41. To secure the rod 32 against movement in either position of the guards a latch 42 is pivotally mounted upon one of the upper stanchion hanging devices 43 and is provided with a hook 44 for engaging the rod 32.

With this construction taken in connection with the drawings when it is desired to move the guards from the position shown in Fig. 1 into the guarding position shown in Fig. 2, the rod 31 is moved toward the right at the same time moving laterally a slight distance which movements will cause the lever 26 to swing the bar 15 into guarding position adjacent one side of the stall upright on which it is mounted and between said upright and the adjacent stanchion and the lever 29 through the link 37 to swing the bar 16 into guarding position adjacent the other side of the stall upright and between said upright and the adjacent stanchion, thus preventing the animal entering its head between the sides of the stanchion and the adjacent stall uprights and compelling her to put her head between the side bars of the stanchion when driven into the stall, the movable side bar 14 resting against one of the guard bars, as shown in Fig. 2. On a reverse movement of the rod 32 the guard bars will move inwardly to a position alongside of the upright on which they are mounted and away from the stanchions as shown in Fig. 1 and thus permit free movement of the animal when secured within the stanchion. In either position the guard operating means may be locked by hooking over the latch 42 onto the rod 32 as this prevents the lateral movement of the rod which is necessary to move the guards.

The invention thus exemplifies a simple and compact construction of stall guard which will effectually prevent the cow from evading the open stanchion when driven into the stalls and which will give her plenty of freedom when she is confined within the stall.

What we claim as our invention is:

1. The combination, with a row of stall frames provided with stanchions and having division standards between the stalls, of horizontally swinging guards comprising guard bars mounted on opposite sides of each standard, a lever fixedly secured to one of said guard bars and pivotally connected intermediate its ends to the upper portion of the stall frames, a lever fixedly secured to the other of said guard bars and pivotally connected at one end to the upper portion of the stall frames, a link directly pivotally connected to said last mentioned lever, and an operating member directly connected to said first mentioned lever and said link for simultaneously moving said guards into and out of guarding position.

2. The combination, with the curb and a row of stall frames provided with stanchions and having posts between the stalls, of a plate secured to the curb and receiving the lower end of one of said stall posts, a pair of mating members secured to said plate and embracing said stall posts, a guard carried at its lower end by each of said members, connections between the upper ends of said guards and the upper portions of the stall frame at opposite sides of said post, and means for simultaneously moving said guards into and out of guarding position.

3. The combination, with the curb and a row of stall frames provided with stanchions and having posts between the stalls, anchors for securing the posts to the curb, a fitting secured to each of said anchors and having arms extending on opposite sides of the post, a fitting secured at the upper end of each post and having arms extending on opposite sides thereof, U-shaped guards on each side of the post pivotally mounted on the arms at the upper and lower portions thereof, and means including levers for simultaneously moving said guards to position between the post and the adjacent stanchions to prevent the animals entering their heads between said post and stanchions when driven into the stalls and to position away from the stanchions when the animals are in the stalls to permit free movement of the animal therein.

In testimony whereof, we affix our signatures.

AUGUST J. KAISER,
FAY C. PETERS.

Copies of this patent may be obtained for five cents each, by addressing the "Commissioner of Patents, Washington, D. C."